United States Patent [19]
Ahlstone

[11] 4,124,229
[45] Nov. 7, 1978

[54] RIGID CONNECTOR FOR PIPE AND METHOD OF MAKING THE SAME

[75] Inventor: Arthur G. Ahlstone, Ventura, Calif.

[73] Assignee: Vetco, Inc., Ventura, Calif.

[21] Appl. No.: 793,496

[22] Filed: May 4, 1977

[51] Int. Cl.$^2$ .............................................. F16L 35/00
[52] U.S. Cl. .................................... 285/18; 285/381; 285/391; 29/446; 29/525
[58] Field of Search .................. 285/18, 381, 90, 91, 285/305, 321, 276, 89, 81, 82, 405, 382, 382.4, 39, 391, 423, 308; 403/15; 29/421 R, 427, 496, 525, 526, 157 R

[56] References Cited
U.S. PATENT DOCUMENTS

| | | | |
|---|---|---|---|
| 1,645,032 | 10/1927 | Wilson | 285/391 X |
| 2,453,669 | 11/1948 | Meneses | 285/423 X |
| 2,671,949 | 3/1954 | Welton | 29/421 X |
| 3,114,566 | 12/1963 | Coberly et al. | 285/381 X |
| 3,606,393 | 9/1971 | Huntsinger et al. | 285/308 X |
| 3,827,728 | 8/1974 | Hynes | 285/309 X |

Primary Examiner—Werner H. Schroeder
Assistant Examiner—C. J. Arbes
Attorney, Agent, or Firm—Bernard Kriegel

[57] ABSTRACT

A pipe connector has a pin initially stabbed into a box, the pin and box then being axially loaded together at confronting transverse surfaces while the pin and box are pressurized to expand the box and compress the pin, so that when the pressure is relieved a pressure energized shrink fit is provided and the connector is rendered rigid to enhance tensile, compressive and bending strength and provide a fluid tight joint useful in making up lengths of pipe such as piles and pipelines.

19 Claims, 8 Drawing Figures

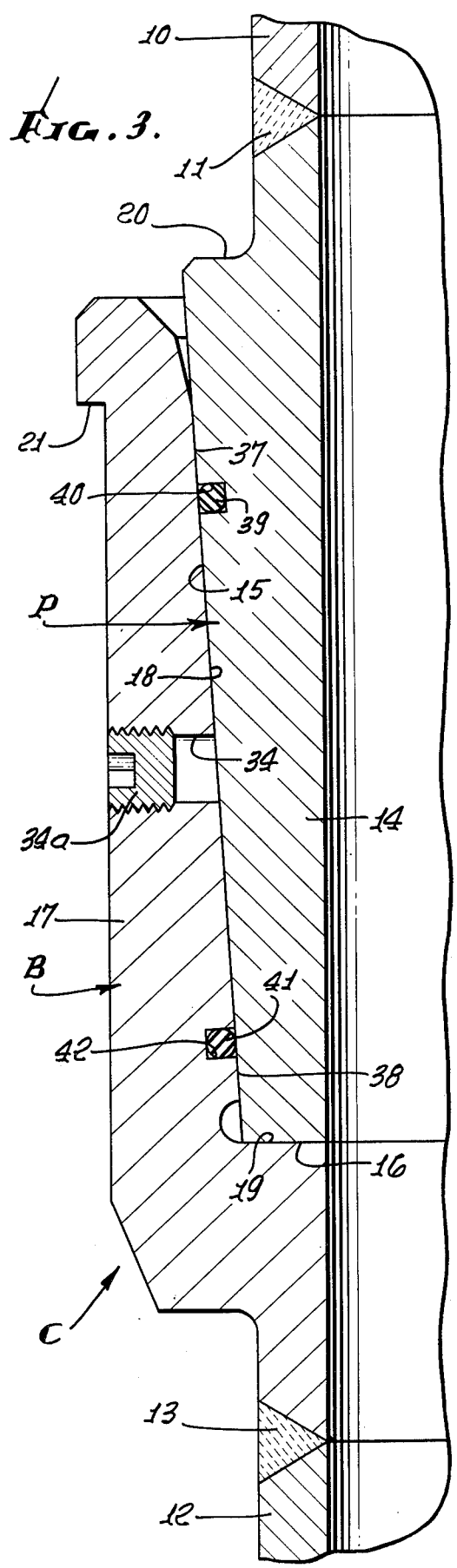
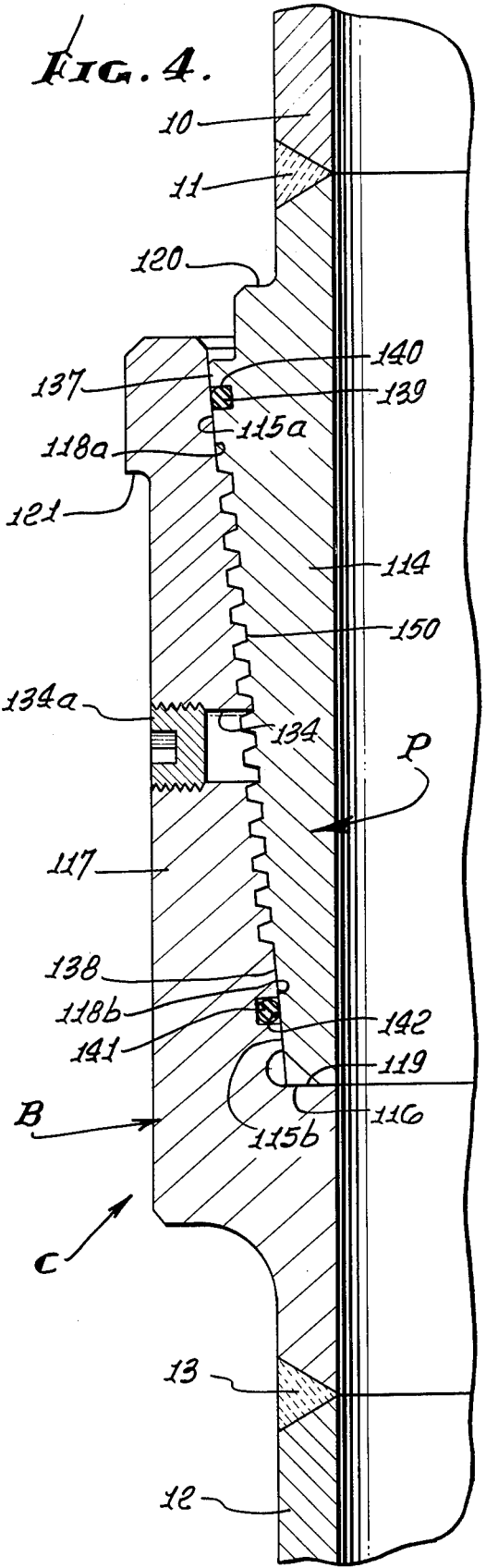

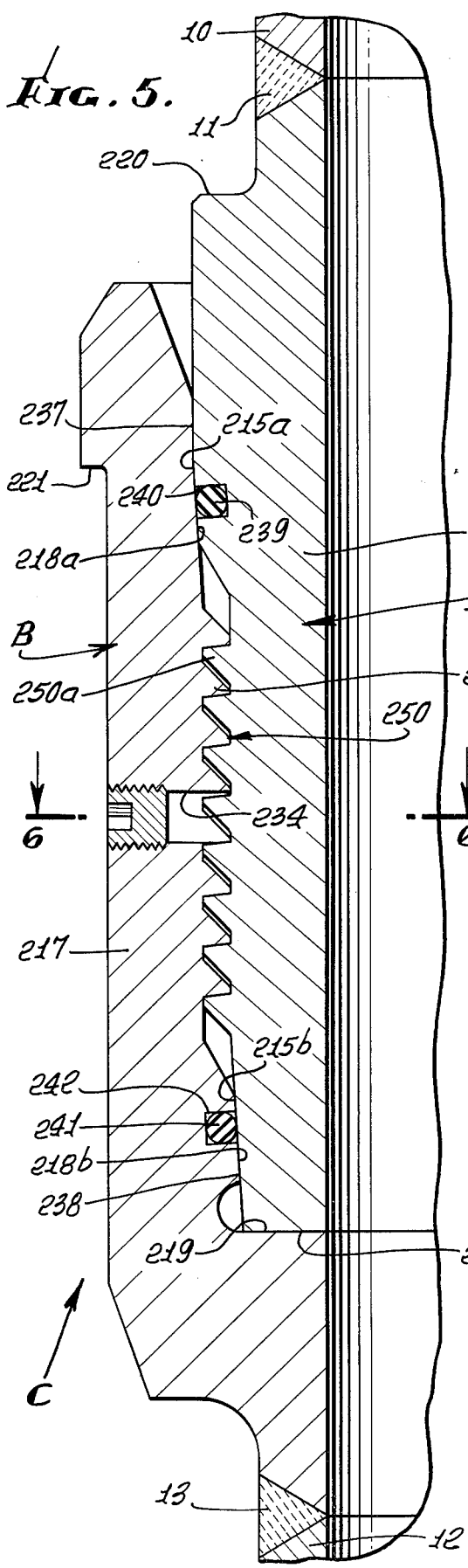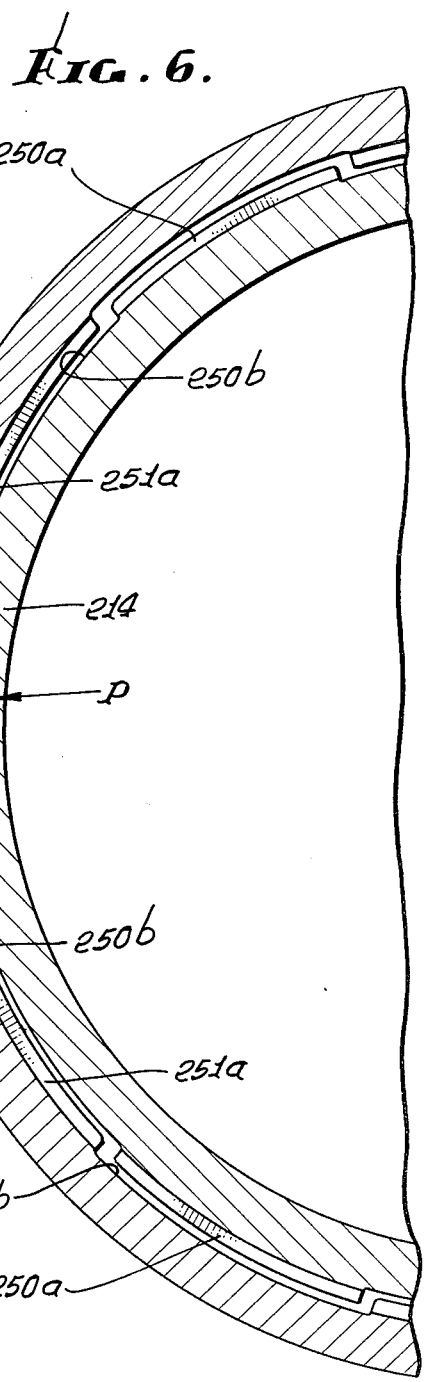

RIGID CONNECTOR FOR PIPE AND METHOD FOR MAKING THE SAME

Heretofore, it has been known that pipe joints or connections may be made up with an interference fit between the pin and the box, by applying fluid pressure between the opposing threaded portions of the pin and the box while the joint parts are rotated to cause the pin and box to shoulder, thereby avoiding the necessity for heating the joint parts to effect a shrink fit. For example, reference may be had to U.S. Pat. No. 2,671,949, granted Mar. 16, 1954, in the name of R. L. Welton, for "Method of Making Tool Joints."

It is also known that pipe line connectors or pile connectors of relatively large diameter can be improved in terms of strength and resistance to separation due to rebound during pile driving operations, if the pin and box are provided with confronting shoulders which are loaded into axial compressive engagement. For example, reference is made to the pending application for U.S. patent Ser. No. 712,491, filed Aug. 9, 1976, in the name of L. E. Reimert, for "Rigid Connector And Piling."

In the pending application of Martin B. Jansen, Jr., Ser. No. 742,072, filed Nov. 5, 1976, there is disclosed a threaded connector for a pipe string, such as a production riser used in connection with sub aqueous wells, in which the threaded connection between the pin member and the box member of the connector is made up initially through an application of relatively low torque to the members, after which the connector has a straight line pretensioning force of a high tensile value applied to it through use of a suitable tool, the high pretensioned force being retained between the mating threads of the pin and box member by a preload reaction member threaded on the pin member and rotated into solid engagement with the box while the pretensioned force is being applied, to lock the preload and the connector between the threads.

In the laying of pipelines, such as offshore pipelines, the joints of pipe are commonly welded, usually on lay barges having work stations for horizontally lining up lengths of pipe, welding the joints, grinding the joints, and subsequent inspection and coating. Such lay barges are very costly, even when used for laying relatively small pipelines in shallow water, and range upwardly, when used for laying larger pipelines offshore.

At the present time, such lay barges may cost up to $350,000.00 per day. When greater water depths are encountered, horizontal pipelines laying becomes impractical, but vertical pipeline installation from semi-submersible rigs constitutes a practical and relatively economical pipeline installation procedure. Welding of the joints or connections is generally preferred, since most connectors are not rigid or are not locked up and must generally be stabbed at a batter angle while the mating joint parts are controlled during makeup by elaborate devices.

There is, accordingly, a need for connectors for pipeline connections and pile connections which can be made up vertically, or with the pipe at a batter angle, say while supported and handled by equipment such as that present on drilling rigs or semi-submersible drilling rigs, which connectors are durable, safe, easy to make up and have pressure resistance, tensile, compression and bending strength characteristics in excess of such characteristics of the pipe body.

The present invention satisfies the need for such connectors by providing a rigid, stab-type connector or pin and box joint which is pre-loaded together axially to force opposed transverse pin and box surfaces into compressive engagement, while the pin and box are subjected to pressure between their confronting or companion interfitting surfaces, to expand the box and compress the pin radially. When the pressure is relieved, the connector is rigid, has an interference fit and is axially pre-loaded so as to have bearing contact for pile driving which resists axial separation due to rebound effects, and has superior tensile, compression, bending and pressure capability, exceeding that of the pipe joined by the connector. Such joints are, therefore, ideally suited for, but not limited to, use in marine piles and pipelines.

In accomplishing the foregoing, the connector has a box section having an internal transverse surface or shoulder and is adapted to have a pin section inserted therein with the inner transverse end surface of the pin disposed for abutting engagement with the shoulder in the box. Axially spaced companion tapered metal sealing surfaces in the box and on the pin are coengaged, and if desired supplemental ring seals may be provided between the metal-to-metal sealing surfaces. The box has a pressure fitting enabling fluid to be supplied under pressure between the pin and box within the region spanned by the sealing portions to pressure energize the box and pin and effect resilient expansion of the box and contraction of the pin, while a pre-load tool is applied to opposing radial shoulders or tool engaging projections on the box and on the pin. Actuation of the tool enables the connector to be finally or fully made up with a predetermined compressive load on the coengaged box and pin transverse surfaces or shoulders, with the box under tension and the pin under compression, and when the energizing pressure on the box and pin is then released, while the parts are held in the pre-loaded condition by the pre-load tool, the box contracts and the pin expands to provide an interference or shrink fit interlocking the connector parts together in their pre-loaded condition.

The box and pin are held in the preloaded condition by the interference fit of opposed tapered surfaces and including in some forms, locking means which prevent axial separation of the pin and box or relaxation of the compressive preload, even during rebound when the connector is used in a pile subjected to the blows of a pile driver. The tapered metal-to-metal sealing surfaces prevent leakage from or into the joint and the combination of the axial pre-load, and the pressure energized fit provides a connector having the advantageous characteristics described above.

This invention possesses many other advantages, and has other objects which may be made more clearly apparent from a consideration of several forms in which it may be embodied. Such forms are shown in the drawings accompanying and forming part of the present specification. These forms will now be described in detail for the purpose of illustrating the general principles of the invention; but it is to be understood that such detailed description is not to be taken in a limiting sense.

Referring to the drawings:

FIG. 3 is an enlarged fragmentary longitudinal section of the pipe connector of FIG. 2 in a fully made up condition;

FIG. 4 is an enlarged fragmentary longitudinal section showing another form of rigid pipe connector;

FIG. 5 is an enlarged fragmentary longitudinal section showing still another form of rigid pipe connector;

FIG. 6 is a transverse section on a reduced scale as taken on the line 6—6 of FIG. 5;

Figure 1:
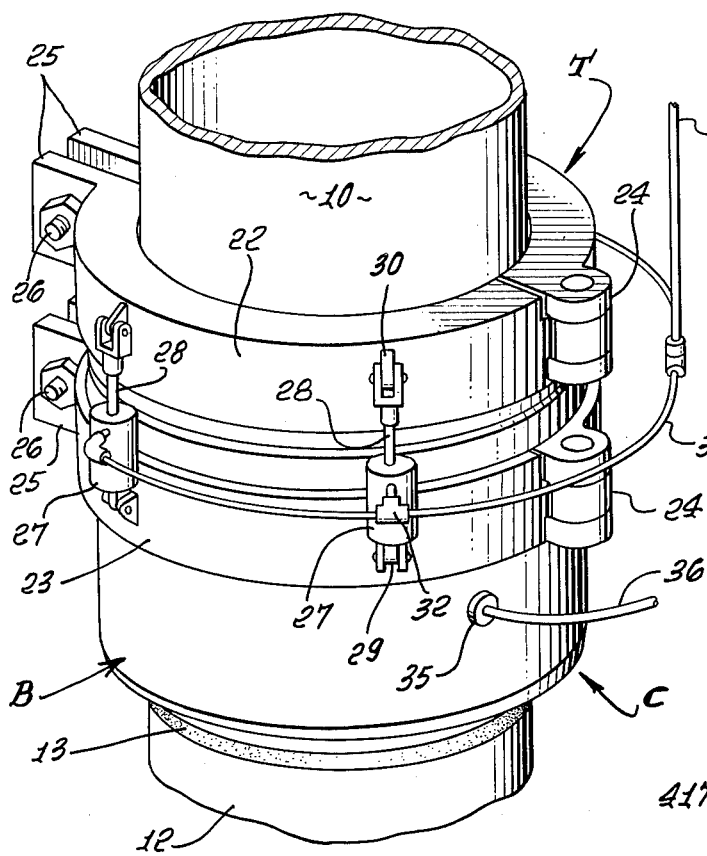
FIG. 1 is a perspective illustrating a pipe and a connector during assembly and in a clamping tool for axially loading the connector while it is pressurized.

As seen in the drawings, a pipe connector C made in accordance with the invention, comprises an upper pin section P and a lower box section B adapted to interconnect pipe lengths, including an upper pipe section 10, secured by a circumferentially continuous weld 11 to the upper end of the pin P, and a lower pipe section 12, secured by a circumferentially continuous weld 13 to the lower end of the box section B. The connector C is shown and will be described as one wherein the connection is stabbed together by insertion of the downwardly extending pin into the upwardly facing box. It should be understood, however, that in the case of some uses of the connector, this relationship of pin to box may be reversed and the box moved over the pin. Preferably, the inner, upper end of the box B is outwardly flared to facilitate stabbing of the pin into the box, and the tapered form of the parts progressively aligns the parts, as the pin moves into the box. The taper angle is preferably a locking angle.

The pin section P includes a circular body section 14 having an external downwardly tapering surface 15 and a lower end surface 16 which extends transversly of the pin body 14. The box section B comprises a circular body section 17 having an internal downwardly tapered surface 18 complemental to the tapered surface 15 of the pin body, whereby when the pin body is inserted or stabbed into the box, the complemental tapered surfaces 15 and 18 are disposed in confronting coengagement. The box body 17 also includes an inner lower transversly extended shoulder or surface 19 against which the pin surface 16 abuts when the connector is made up. The strength of such joints, as thus far described, in terms of resistance to axial separation or tensile strength, compressive and bending strength, as well as the ability of the connector to withstand fluid pressure, both from within and from without, is dependent upon the extent to which the confronting transverse surfaces 16 and 19 are axially preloaded and the extent to which there is a tight interference fit between the confronting tapered surfaces 15 and 18 of the respective pin and box members.

The present invention provides a joint of superior strength characteristics by reason of the fact that the pin and box sections of the joint or connector are made up in a novel manner. In the vicinity of the upper end of the pin body 14, it is provided with a radially extended, upwardly facing, thrust or pre-load shoulder 20, and adjacent the upper end of the box body 17, it is provided with an external radially outwardly projecting, downwardly facing, thrust shoulder 21. These thrust or preload shoulders 20 and 21 are adapted to provide means engageable by a suitable makeup or loading tool T, whereby as indicated by the respective arrows 20a and 21a in FIG. 2, a compressive axial force can be applied to the pin body 14 to load the pin end 16 against the inner box surface 19 while the box body 17 is under tension.

The tool T may be of any suitable form to provide opposing forces as represented by the arrows 20a and 21a, and as illustrated in FIG. 1, such a tool may comprise an upper ring 22 and a lower ring 23, each of the rings 22 and 23 having suitable hinge means 24 hingedly interconnecting ring half parts together so that the ring may be opened for lateral application about the pipe and about the connector. Each ring 22 and 23 also is provided with suitable means, such as outstanding ears 25, at the free ends of the ring half parts, and adapted to receive bolts 26 whereby the rings 22 and 23 may be assembled and secured about the pipe and connector for engagement with the respective thrust shoulders 20 and 21 on the pin and on the box. Means are provided for pulling the rings 22 and 23 axially towards one another, when the rings are disposed about the pipe and connector, so as to apply the opposite forces referred to above. As shown, the pulling means comprises a suitable number of circumferentially spaced hydraulic cylinders 27 having rods 28 projecting therefrom, with the respective cylinders connected to one of the rings as at 29 and the rods connected to the other of the rings as at 30. A hydraulic line 31 is adapted through suitable fittings 32 to supply hydraulic fluid under pressure to the cylinders 27 from a source conduit 33 which is connected to the conduit 31 and to a suitable fluid pressure source (not shown). Thus, when hydraulic fluid is supplied to the cylinders 27 to retract the rods 28 and force the rings 22 and 23 towards one another, the pin and box bodies 14 and 17 can be axially preloaded.

In addition, as mentioned above, the strength of the connector is also dependent upon the interference fit between the opposing tapered pin surface 15 and box surface 18. Accordingly, the box body 17 is provided with at least one radial pressure port 34 threaded to receive a connector fitting 35 for a hydraulic line 36, whereby fluid under pressure can be supplied between the confronting tapered surfaces 15 and 18 of the pin and box between an upper opposed sealing region 37 and a lower opposed sealing region 38 between the tapered pin and box surfaces. The sealing effectiveness of the upper and lower tapered, metal-to-metal sealing regions 37 and 38 may be enhanced by the provision of an upper, annular and resilient sealing ring 39 disposed in a groove 40 in the pin or the box body and a lower, annular and resilient sealing ring 41 disposed in a groove 42 in the pin or the box body, the sealing rings 39 and 41 being sealingly engaged with the opposed tapered surfaces of the respective members.

Figure 2:
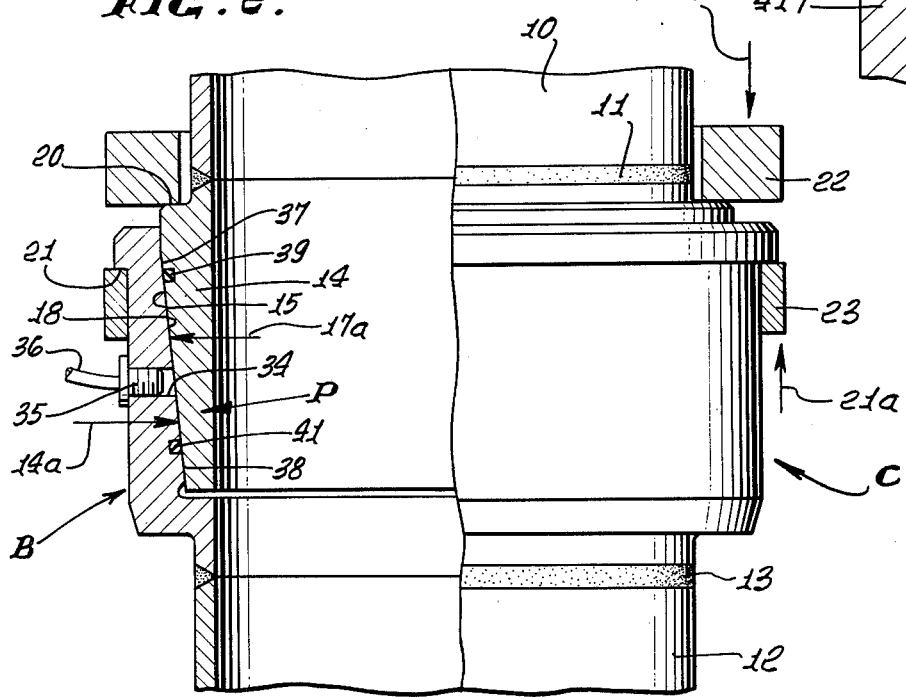
FIG. 2 is a partial elevation and partial longitudinal section of one form of pipe connector, with the clamping tool broken away, and showing the connector parts stabbed together prior to final makeup.

As seen in FIG. 2, and somewhat exaggerated, when the pin P is stabbed into the box B to the extent that a seal is provided at the upper and lower sealing regions 37 and 38 therebetween, the lower end 16 of the pin P is not fully axially loaded against the confronting box shoulder 19, and as previously indicated, such loading is accomplished in response to the application of the opposing forces by the loading tool T. During the operation of the tool T to axially pre-load the connector, hydraulic fluid under pressure is admitted through the port 34, between the upper and lower sealing regions 37 and 38, sufficient to apply substantial circumferential compressive force to the pin body 14, as indicated by the arrow 14a in FIG. 2, and substantial expansive force, as indicated by the arrow 17a, to the body 17 of the box.

The connector is finally made up while the fluid pressure is maintained, by actuation of the tool T to axially load the confronting pin and box surfaces 16 and 19, while the pin body 14 is under compression and the box body 17 is under tension. Accordingly, when the fluid pressure is relieved there will be effected a pressure energized interference fit between the tapered pin surface 15 and box surface 18, while the confronting transverse surfaces 16 and 19 of the pin and box are in an axially preloaded condition. As a result, the completed joint or connector, as seen in FIG. 3, will have superior strength characteristics in terms of tensile, compressive and bending strength and a fluid tight joint is provided which is useful in making up lengths of pipe such as piles and pipelines.

When the hydraulic line connector 35 has been removed from the pressure port 34, it is preferred that the port 34 be plugged by a suitable screw plug 34a as seen in FIG. 3.

Such a connection of pipe sections 10 and 12 can be easily and quickly made with the usual pipe handling equipment found on drilling barges and the like and with the pipe sections disposed vertically or at batter angles while being initially stabbed together and the making up of the connection can be accomplished more quickly than welded connections have been heretofore made. Thus, the invention not only provides a strong and durable connection which can withstand the severe service of subsea pipelines and piles, but economies are effected in terms of the speed with which the connections can be made up utilizing the very expensive rig or barge equipment.

Referring to FIG. 4, the rigidized connector for the pipe sections 10 and 12 also includes companion pin and box members P and B having structure adapting the connector to be made up while axial preload force is supplied thereto by the loading tool T and hydraulic pressure is applied between the pin and box to provide a pressure energized fit therebetween.

In this form, the pin body 114 has, at its lower end, a transversly disposed end surface or face 116. The tapered pin body 114 has upper and lower tapered portions 115a and 115b adapted to engage within the companion tapered upper and lower bore sections 118a and 118b of the box body 117. Here again, the pin body 114 adjacent its upper end has an upwardly facing shoulder 120 providing a means engageable by one of the rings of the loading tool T, and adjacent the upper end of the box body 117 is a downwardly facing shoulder 121 which provides means engageable by the other ring of the loading tool T.

The confronting upper tapered pin and box surfaces 115a and 118a provide an upper sealing section 137, and the confronting tapered surfaces 115b on the pin and 118b in the box provide a lower sealing section 138. Suitable resilient ring seals 139 in a groove 140 and 141 in a groove 142 at the respective upper and lower sealing sections 137 and 138 may be employed to supplement the metal-to-metal seal provided between the companion tapered surfaces.

Between the upper and lower confronting tapered pin and box sections, the pin body 114 and the box body 117 are provided with companion threads 150 coengageable upon stabbing of the pin into the box, whereby relative rotation of the pipes 10 and 12 will effect initial makeup of the connector and initial loading of the confronting pin surface 116 against the box shoulder 117.

The radial fluid pressure port 134 in the pin body 117 provides means for connecting thereto a pressure fluid connector such as previously described, whereby hydraulic fluid under pressure can be supplied to the region of the confronting pin and box surfaces between the upper and lower sealing sections 137 and 138 to pressurize the parts by applying a compressive force to the pin body 114 and expansive force to the box body 117, while axial preloading force is applied to the respective pin and body shoulders 120 and 121, during final relative rotation of the pin and box to effect a final preloaded makeup between the shoulders 116 and 117. Thereafter, when the hydraulic fluid pressure is relieved from the connector the fit of the pin and the box in the threaded region is enhanced by the resultant contraction of the box about the pin.

The resultant connection from the structure of FIG. 4 therefore provides superior strength characteristics as previously described and the pressure energized threaded connection and the preloaded pin and box surfaces 116 and 117 further enable the connector to withstand severe strain as well as the effects of hammer blows applied to the pipe as in the case of pile connections.

In the rigidized connector as illustrated in FIGS. 5 and 6, the pipe sections 10 and 12 are again connected to the pin and box connector members by their respective welds 11 and 13. The downwardly tapered pin body 214 has axially spaced upper tapered surfaces 215a and lower tapered surfaces 215b adapted to engage within the confronting tapered surfaces 218a and 218b within the box body 217. At its lower end the pin body 218 terminates in a transversly disposed end surface 216 adapted to abut with the opposing upwardly facing internal shoulder or seat 219 within the box body 217.

Adjacent its upper end, the pin body 214 has the outwardly and upwardly facing shoulder 220 providing means engageable by the upper ring of the loading tool T, as previously described, and adjacent its upper end the box body 217 has the outward and downwardly facing shoulder 221 providing means engageable by the lower ring of the loading tool T.

The opposing pin and box surfaces 215a and 218a provide an upper sealing section 237 which may be supplemented in its sealing effectiveness by means of the resilient seal ring 239 disposed in a groove 240 in one of the pin or the box bodies, and the confronting lower tapered surfaces 215b and 218b likewise provide a lower annular sealing section 238, the sealing effectiveness of which can be supplemented by the provision of a suitable resilient ring seal 241 disposed in a groove 242 in one of the pin and box bodies.

In this embodiment, the pin P is adapted to be stabbed into the box B into an initial sealing position to enable the application of hydraulic fluid under pressure through the port 234 to place the pin P under a compressive force while the box B is subjected to the expansive force, and the tool T applies an axial compressive load on the pin shoulder 220 and a tension load upon the box shoulder 221 to load the confronting pin and box shoulders or surfaces 216 and 219 into axial compression.

Means are provided for locking the pin and box B against axial movement with the shoulders 216 and 219 preloaded, while the pin and box bodies are subjected to the pressure of hydraulic fluid supplied through the port 234. Thus, the pin body 214 and the box body 217 have interrupted thread means 250. As seen in FIG. 6, the pin body 214 has a series of circumferentially spaced rows of buttress thread segments 250a and intervening vertical grooves 250b. Within the box body 217 is a companion series of circumferentially spaced vertical rows of buttress teeth 251a and intervening vertical grooves 251b. Thus, when the pin P is stabbed into the box B with the respective thread segments 250a and 251a axially aligned with the respective grooves 250b and 251b, the connector can be initially made up, pressurized by the application of hydraulic fluid through the port 234 and axially preloaded by the tool T engaging the shoulders 220 on the pin P and 221 on the box B to preload the pin and box shoulders 216 and 219 together, while the pin and box are relatively rotated to coengage the thread segments 250a and 251a, thereby interlocking the pin and box positively against axial movement when the pressure between them is relieved to effect the pressure energized interference fit.

Figure 7:
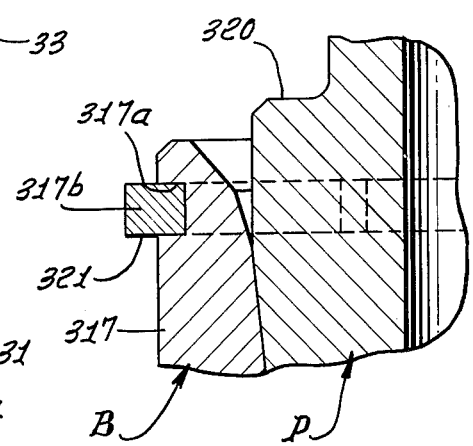
FIG. 7 is a fragmentary longitudinal section showing another form of a shoulder structure engageable by the loading tool.
Figure 8:
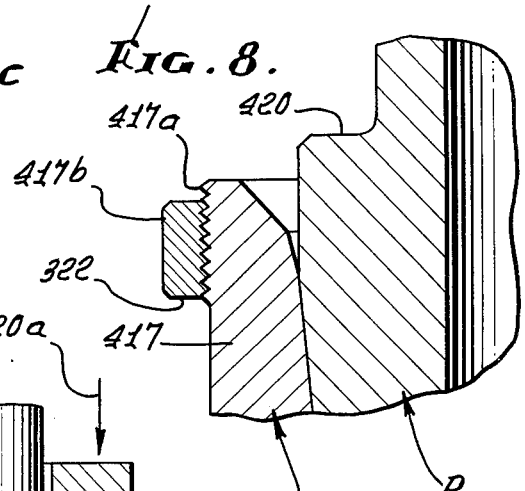
FIG. 8 is a fragmentary longitudinal section showing still another form of a shoulder structure engageable by the loading tool.

While in the embodiments of the invention as described above, the shoulders on the respective pins and boxes for engagement by the rings of the tool so that the opposing axial forces can be applied to the connector have been shown as shoulders formed on the respective pin and box bodies such shoulders may be otherwise provided. As seen in FIGS. 7 and 8 alternate structures providing shoulders engageable by the loading tool rings are shown. In FIG. 7, one of the connector body parts, specifically shown as the box part 317, has adjacent its upper end an external annular groove 317a receiving a split metallic ring 317b which provides the downwardly facing shoulder 321 engageable by the ring of the loading tool. After the connection has been completely made up, as previously described, if desired, the split ring 317b can be removed from the groove 317a. As illustrated, the other upwardly facing shoulder 320 on the pin P is provided in the same manner as previously described, but the shoulder 320 can be otherwise provided and otherwise located to receive the other ring of the loading tool to place the pin body in compression against the seat within the box B.

Referring to FIG. 8, the upper end of the body 417 of the box B has external threads 417a threadedly receiving a collar 417b which provides the downwardly facing thrust shoulder 322 against which the lower ring of the loading tool is engageable, while the upper ring of the tool engages the upwardly facing shoulder 420 on the pin P.

From the foregoing it will now be apparent that the present invention provides a pipe connector for use in making up lengths of pipe such as piles and pipelines wherein the pressure energization of the fit between the tapered pin and box members and the axial preloading of the pin P against the inner shoulder of the box while the box is held in tension results in the production of a rigidized pipe joint of superior strength and durability and which can be readily and quickly made up utilizing the usual pipe handling and supporting equipment provided on drilling rigs and barges and with the pipe sections disposed vertically or at some batter angle.

I claim:

1. A rigid pipe connector comprising: a pin and a box; said pin having an externally tapered section and a transverse make up surface; said box having an internally tapered body section to receive the tapered section of said pin and having an inner transverse make up surface confronting said pin make up surface; said pin section and said box section having therebetween axially spaced companion tapered sealing portions; said box section having port means between said sealing portions for admission therebetween of a pressure fluid acting to circumferentially expand said box section and compress said pin section; and means on said pin and box engageable by a loading tool for axially relatively forcing said sections and compressively loading said make up surfaces while said pressure fluid is acting on said sections; said pin and box sections being held against axial separation with said make up surfaces in compression and said box section in tension by a pressure energized shrink fit between said pin section and said box section upon relief of said pressure fluid.

2. A rigid pipe connector as defined in claim 1; wherein said make up surfaces comprise an end surface of said pin section and a shoulder at the inner extremity of the box section.

3. A rigid pipe connector as defined in claim 1; wherein said means on said box engageable by said loading tool comprises a shoulder adjacent the open end of the box, whereby said box section is tensioned by said loading tool.

4. A rigid pipe connector as defined in claim 1; wherein said make up surfaces comprise an end surface of said pin section and a shoulder at the inner extremity of the box section, said means on said box engageable by said loading tool comprises a shoulder adjacent the open end of the box, whereby said box section is tensioned by said loading tool.

5. A rigid pipe connector as defined in claim 1; wherein said make up surfaces comprise an end surface of said pin section and a shoulder at the inner extremity of the box section, said means on said box engageable by said loading tool comprises a shoulder adjacent the open end of the box, whereby said box section is tensioned by said loading tool, and said means on said pin engageable by said loading tool comprises another shoulder on said pin adjacent its other end, whereby said pin section is placed in compression by said loading tool.

6. A rigid pipe connector as defined in claim 1; wherein said pin section and said box section have locking means therebetween held coengaged by said shrink fit and locking said sections against relative axial movement.

7. A rigid pipe connector as defined in claim 1; including coengaged locking means on said pin and box locking them against relative axial movement.

8. A rigid pipe connector as defined in claim 1; wherein said pin section and said box section have locking means therebetween held coengaged by said shrink fit and locking said sections against relative axial movement, said locking means including threads on the confronting tapered pin and box surfaces.

9. A rigid pipe connector as defined in claim 1; wherein said pin section and said box section have locking means therebetween held coengaged by said shrink fit and locking said sections against relative axial movement, said locking means including complemental circumferentially spaced axially extended rows of teeth having circumferentially spaced axially extended grooves between said rows of teeth and grooves enabling said pin and box to be stabbed axially together and rotated to interlock said teeth while said pressure fluid is acting on said sections.

10. A rigid pipe connector as defined in claim 9; wherein said teeth are threads.

11. A rigid pipe connector as defined in claim 9; wherein said teeth are threads of the buttress type.

12. A rigid pipe connector as defined in claim 1; wherein said means on said pin and box engageable by a loading tool includes means forming oppositely facing thrust shoulders on said pin and box.

13. A rigid pipe connector as defined in claim 12; wherein said shoulder forming means includes means removably connected to one of said pin and box.

14. A rigid pipe connector as defined in claim 12; wherein said shoulder forming means comprises a collar threaded onto one of said pin and box.

15. A rigid pipe connector as defined in claim 12; wherein said shoulder forming means comprises a split ring, one of said pin and box having an annular groove removably receiving said ring.

16. The method of making rigid pipe connections comprising: axially coengaging tapered pin and tapered box connector parts and disposing opposing axially spaced sealing portions thereof in sealing relation and transversely disposed makeup shoulders thereof in opposing initial confronting relation, compressively loading said makeup shoulders together by applying opposite axial forces to said pin and box placing said pin in compression and said box in tension while circumferentially expanding said box and compressing said pin by the application of pressure fluid therebetween said sealing portions thereof, and then relieving said pressure fluid to allow shrinking of said box and expansion of said pin into interlocking relation with said pin and box respectively held in axial compression and tension.

17. The method of claim 16; including relatively rotating said pin and box and engaging complemental threads thereon to dispose said makeup shoulders in said initial relationship before applying said pressure fluid, and then further relatively rotating said pin and box while applying said opposite axial forces and during said application of pressure fluid to lock said shoulders in compression upon relief of said pressure fluid.

18. The method of claim 16; including relatively rotating said pin and box while applying said opposite axial forces and during said application of pressure fluid to coengage axially extended circumferentially spaced rows of teeth on said pin and in said box to lock said shoulders in compression upon relief of said pressure fluid.

19. The method of claim 16; wherein said pin and box are locked with said shoulders in compression by coengagement of the opposing tapered surfaces thereof upon relief of said pressure fluid.

* * * * *